(12) United States Patent
Tanaka et al.

(10) Patent No.: US 6,218,755 B1
(45) Date of Patent: Apr. 17, 2001

(54) DYNAMO-ELECTRIC MACHINE AND METHOD OF MANUFACTURE THEREFOR

(75) Inventors: Toshinori Tanaka; Ryuichi Ikeda; Akihiro Daikoku; Yuji Nakahara; Kyouhei Yamamoto; Kazuhisa Takashima, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/317,169

(22) Filed: May 24, 1999

(30) Foreign Application Priority Data

Oct. 23, 1998 (JP) .................................................. 10-302309

(51) Int. Cl.$^7$ .............................. H02K 3/04; H02K 1/00; H02K 11/00; H01R 39/08
(52) U.S. Cl. ......................... 310/204; 310/234; 310/198; 310/71
(58) Field of Search .................................... 310/234, 198, 310/233, 204, 231, 71, 203, 195, 179; 29/597

(56) References Cited

U.S. PATENT DOCUMENTS

| | | | |
|---|---|---|---|
| 3,484,634 | * | 12/1969 | Ireland .................................. 310/204 |
| 3,590,296 | * | 6/1971 | Dumez .................................. 310/234 |
| 3,781,981 | * | 1/1974 | Miura et al. ........................... 29/597 |
| 3,942,246 | * | 3/1976 | Wilding ................................. 29/597 |
| 4,633,577 | * | 1/1987 | Banner .................................. 29/597 |
| 4,876,472 | * | 10/1989 | Shiraki et al. ........................ 310/198 |
| 5,113,574 | * | 5/1992 | Nuss ..................................... 29/597 |

FOREIGN PATENT DOCUMENTS

| | | |
|---|---|---|
| 56-149565 | 4/1955 | (JP) . |
| 358039248A | * 3/1983 | (JP) . |
| 59-86847 | 6/1984 | (JP) . |

* cited by examiner

Primary Examiner—Thomas M. Dougherty
Assistant Examiner—Guillermo Perez
(74) Attorney, Agent, or Firm—Sughrue, Mion, Macpeak & Seas, PLLC

(57) ABSTRACT

A dynamo-electric machine comprises a shaft, a core secured to the shaft having slots formed therein extending in the axial direction, a winding composed of a wiring wound by a lap winding method through the slots, a commutator having commutator segments disposed at one end of the core and secured to the shaft, and equalizing connectors electrically connecting commutator segments which should have the same electric potential to each other, wherein the equalizing connectors are disposed in close contact with an end surface of the commutator.

15 Claims, 9 Drawing Sheets

DYNAMO-ELECTRIC MACHINE AND METHOD OF MANUFACTURE THEREFOR

BACKGROUND OF THE INVENTION

1. Field of the Invention

The present invention relates to a dynamo-electric machine which comprises equalizing connectors electrically connecting commutator segments which should have the same electric potential to each other, and to a method of manufacture therefor.

2. Description of the Related Art

FIG. 14 is a partial cross-section of an electric motor which is a conventional dynamo-electric machine. In this electric motor, a commutator assembly 101 is disposed in the vicinity of an armature 100.

The armature 100 comprises: a core 102 having slots extending in the axial direction; and a winding 103 composed of wiring wound by a lap winding method through the slots.

The commutator assembly comprises: a commutator 105 having commutator segments 104 arranged around its circumference and risers 106 electrically connected to the winding 103; brushes (not shown) which contact the commutator segments 104; and equalizing connectors 107 electrically connecting commutator segments 104 which should have the same electric potential to each other. End portions 108 of the equalizing connectors 107 shown in FIG. 15 are secured to the risers 106 by brazing, etc. The equalizing connectors 107 are secured and supported by a securing member 109, enabling the equalizing connectors 107 to withstand centrifugal force.

In the above 4-pole lap-wound electric motor, an electric current is supplied to the winding 103 from outside by means of the brushes contacting the commutator segments 104, whereby the armature 100, equalizing connectors 107, and the commutator 105, which are all secured to a rotating shaft (not shown), rotate together with the shaft due to electromagnetic effects.

In an electric motor of the above construction, the equalizing connectors 107 are provided to prevent circulating currents which run through the brushes generated by differences in induced voltage between circuits in the winding 103, but one problem is that these equalizing connectors 107 require the securing members 109 for support, increasing the number of parts.

Another problem is that space is required to hold the equalizing connectors 107 and the securing members 109, and such space is difficult to procure, particularly in a small electric motor for use in an automobile.

SUMMARY OF THE INVENTION

The present invention aims to solve the above problems and an object of the present invention is to provide a dynamo-electric machine enabling reductions in the number of parts as well as in size, etc., and to provide a method of manufacture therefore.

To this end, according to the present invention, there is provided a dynamo-electric machine comprising: a shaft; a core secured to the shaft having slots formed therein extending in the axial direction; a winding composed of a wiring wound by a lap winding method through the slots; a commutator having commutator segments disposed at one end of the core and secured to the shaft; and equalizing connectors electrically connecting commutator segments which should have the same electric potential to each other; the equalizing connectors being disposed in close contact with an end surface of the commutator.

According to another aspect of the present invention, there is provided a method of manufacture for a dynamo-electric machine including: a step of connecting commutator segments which should have the same electric potential to each other by cutting the wire after using the wire to fasten commutator segments which should have the same electric potential to each other, and a step of immediately thereafter forming a winding by winding the wire onto the core.

According to still another aspect of the present invention, there is provided a method of manufacture for a dynamo-electric machine including: a step of connecting the commutator segments to each other continuously by a continuous wire, a step of forming equalizing connectors by removing unwanted wire connecting the commutator segments to each other, and a step of electrically connecting both ends of the equalizing connectors to the commutator segments.

DETAILED DESCRIPTION OF THE PREFERRED EMBODIMENTS

Embodiment 1

Figure 1:
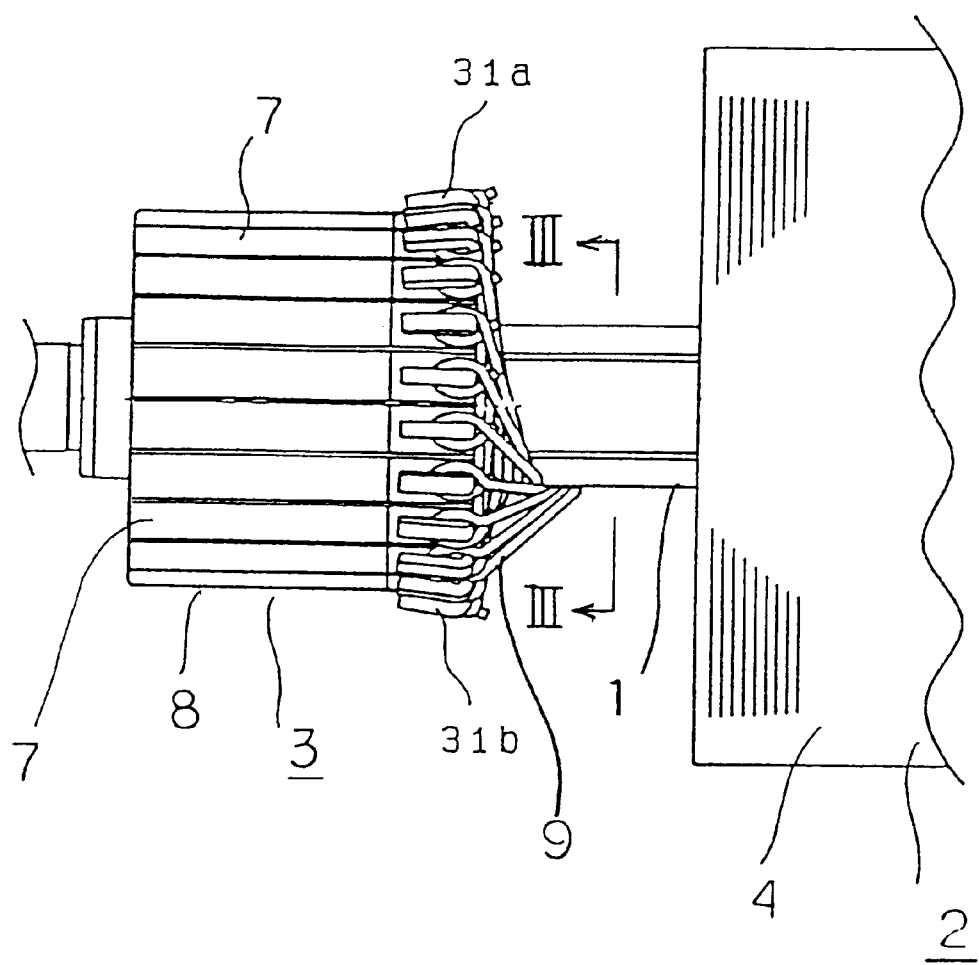
FIG. 1 is a partial side elevation of an electric motor according to Embodiment 1 of the present invention.
Figure 2:
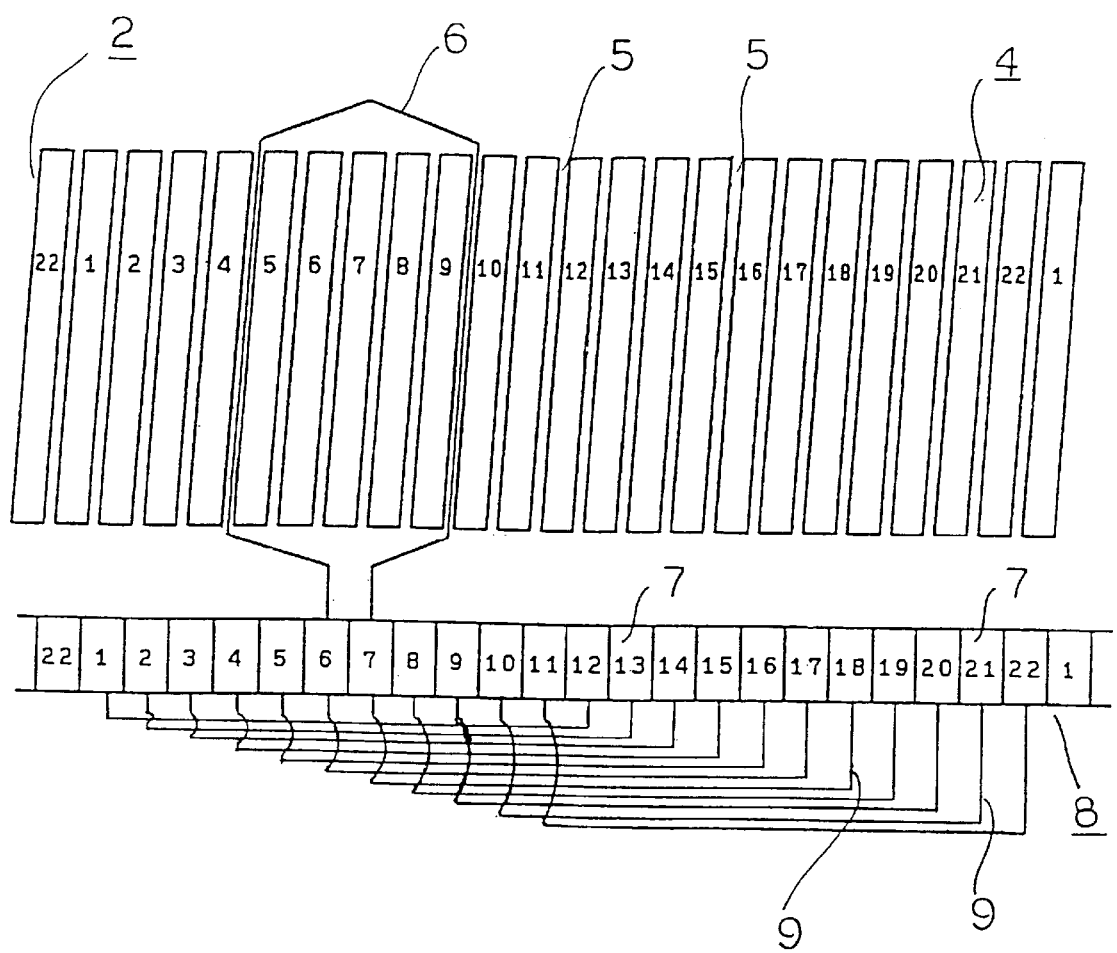
FIG. 2 is a winding diagram for the electric motor in FIG. 1.
Figure 3:
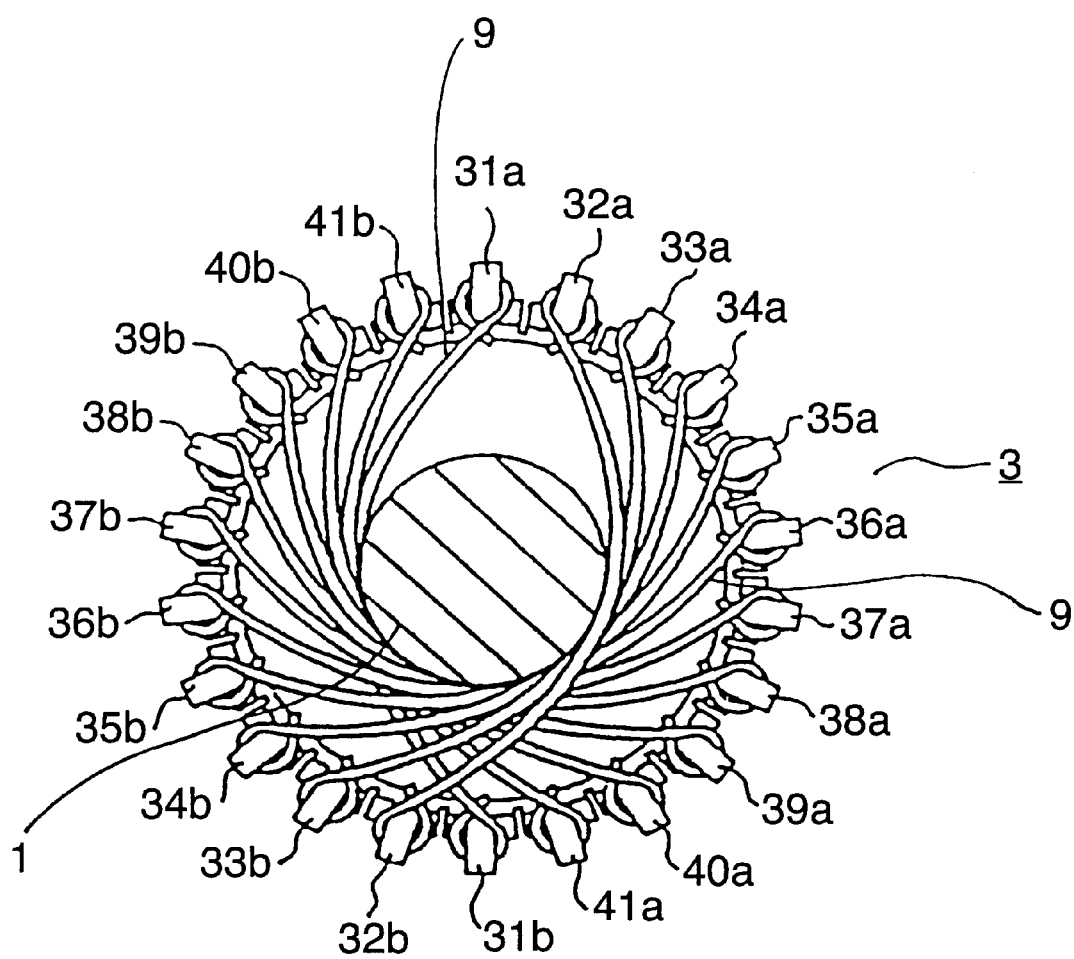
FIG. 3 is a cross-section taken along line III—III in FIG. 1.

FIG. 1 is a partial side elevation of an electric motor according to Embodiment 1 of the present invention, FIG. 2 is a winding diagram for the electric motor in FIG. 1, and FIG. 3 is a cross-section taken along line III—III in FIG. 1.

The electric motor comprises: a cylindrical yoke (not shown); four permanent magnets (not shown) composed of ferrite secured inside the yoke and spaced circumferentially; a shaft 1 disposed inside the yoke by a bearing so as to be freely rotatable; an armature 2 secured to the shaft 1; and a commutator assembly 3 disposed at one end of the armature 2.

As shown in FIG. 2, the armature 2 comprises: a core 4 having twenty-two slots 5 extending in the axial direction; and a winding composed of enamel-coated copper wiring 6 wound through the slots. The winding is constructed a so-called "lap-winding method" in which the wiring 6 is repeatedly wound, for example, ten turns then offset by one slot and the wiring 6 wound for another ten turns, and so on.

The commutator assembly 3 comprises: a commutator 8 having twenty-two commutator segments 7 arranged in the circumferential direction secured to an end portion of the shaft 1; four brushes disposed at equidistant intervals which contact the surface of the commutator 8 by means of the elastic force of springs; and equalizing connectors 9 electrically connecting the hooks 31a to 41b of commutator segments 7 which should have the same electric potential to each other.

One end of an equalizing connector 9 is fastened to a hook 31a of a commutator segment 7, and the other end is fastened to a hook 31b opposite the first hook 31a. Similarly, one end of another equalizing connector 9 is fastened to a hook 32a of a commutator segment 7, and the other end is fastened to a hook 32b opposite the first hook 32a. in the same way, one end of each of the nine other equalizing connectors 9 is fastened to one of the hooks 33a to 41a, and the other end thereof is fastened to one of the hooks 33b to 41b, respectively. Each of these equalizing connectors 9 is in close contact with the end surface of the commutator assembly 3 facing the electric motor 2.

In an electric motor of the above construction, wire of the same diameter and the same material (enamel-coated copper wire) is used for both the equalizing connectors 9 and the wiring 6, the equalizing connectors 9 being in close contact with the end surface of the commutator 8 and the winding being disposed on the core 4.

The manufacturing procedure in this case is first to fasten the wire onto the hooks of commutator segments 7 which should have the same potential, then to cut the wire. This operation is repeated to connect one end of each of eleven equalizing connectors 9 to each of the hooks 31a to 41a and the other end thereof to each of the hooks 31b to 41b, respectively. Thereafter, the winding is disposed on the core 4 by winding the wire onto the core 4 by a lap winding method by means of the hooks 31a to 41b. Because this series of steps, namely, fastening, cutting, and winding, is performed by a winding machine, it is carried out efficiently.

Then, after the equalizing connectors 9 are physically connected to commutator segments 7 which should have the same electric potential, and the wiring 6 is wound by a lap winding method into each of the slots 5 in the core 4 in this manner, then each of the hooks 31a to 41b are electrically connected to the equalizing connectors 9 and the wiring 6, respectively, by simultaneous fusing, etc.

Moreover, the winding in the above embodiment is constructed by a so-called "double winding". That is to say, the winding is composed of forty-four coil portions formed from single coil portions formed by winding wiring 6 of half the cross-sectional area of a single-wind wire ten turns then offsetting each new coil portion one slot at a time for two laps around the circumference of the core 4. Consequently, the winding time is longer than that of a single winding composed of twenty-two coil portions, but the wiring 6 is finer than the wiring in a single winding, increasing windability and increasing the wire-to-space ratio of the winding in the slots 5.

Embodiment 2

Figure 4:
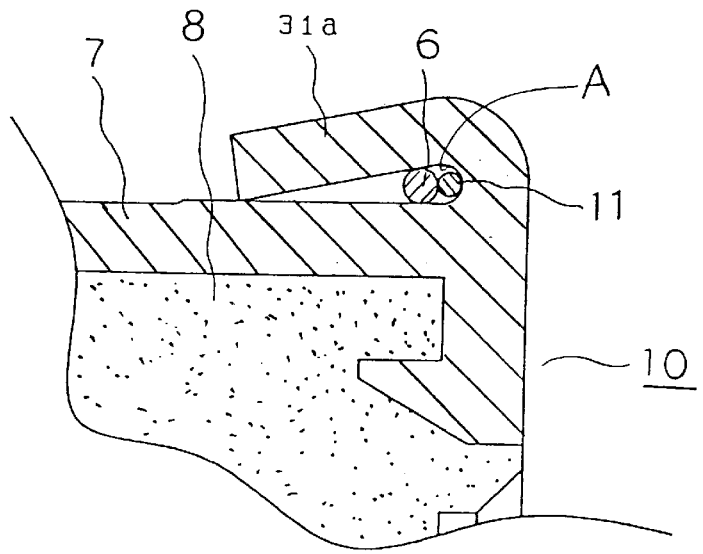
FIG. 4 is a partial cross-section of a commutator assembly for an electric motor according to Embodiment 2 of the present invention.

FIG. 4 is a partial cross-section of a commutator assembly 10 for an electric motor according to Embodiment 2 of the present invention. Moreover, in the explanations for each of the following embodiments, portions the same as or corresponding to those in Embodiment 1 will be explained using the same numerals.

Equalizing connectors 11 in the commutator assembly 10 are composed of the same material as the wiring 6, but have a smaller diameter than the wiring 6. Also, the equalizing connectors 11 are in contact with the bent portion A of each of the hooks 31a to 41b.

The hooks 31a to 41b are bent at the time of fusing and a space is formed on the side of bent portion A at that time. In this embodiment, the slender wire of the equalizing connectors 11 occupies this space, and the equalizing connectors 11 can be fastened to hooks having the spaces of existing commutator assemblies.

Moreover, the equalizing connectors 11 are composed of copper wire as an electric conductor with a surface coating of enamel as an insulating coating, but a copper alloy (brass, for example) can be used as the electric conductor in the equalizing connectors 11 in Embodiment 2 since in that case breakages will not occur even if the diameter is small. An insulating resin may be used as the insulating coating.

Embodiment 3

Figure 5:
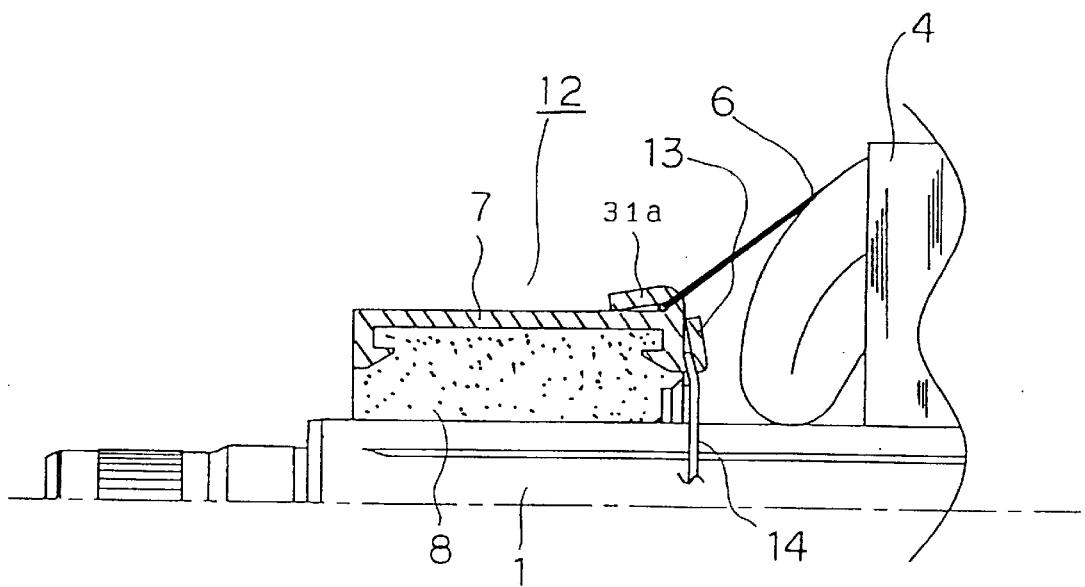
FIG. 5 is a partial cross-section of an electric motor according to Embodiment 3 of the present invention.

FIG. 5 is a partial cross-section of an electric motor according to Embodiment 3 of the present invention.

In the commutator assembly 12 in this embodiment, equalizing connector fastening portions 13 are formed on the side of each of the hooks 31a to 41b closest to the core 4. Equalizing connectors 14 with a larger diameter than that of the wiring 6 are fastened to the equalizing connector fastening portions 13.

In this embodiment, the equalizing connectors 14 can first be electrically connected to each of the equalizing connector fastening portions 13, and after the step of connecting the equalizing connectors 14, there is no need to proceed to manufacture the winding immediately, increasing the degree of freedom in the manufacturing process for the electric motor.

Furthermore, because the diameter of the wire in the equalizing connectors 14 is large and equalizing connectors 14 alone are electrically connected to the equalizing connector fastening portions 13 by fusing, the electrical connection is sound, increasing reliability with respect to electrical connections.

Furthermore, the equalizing connector fastening portions 13 are located radially inwards from the commutator 8 and radially further inwards than the sliding surfaces of the commutator 8 on which the brushes slide, facilitating mounting of the brushes.

Embodiment 4

Figure 7:
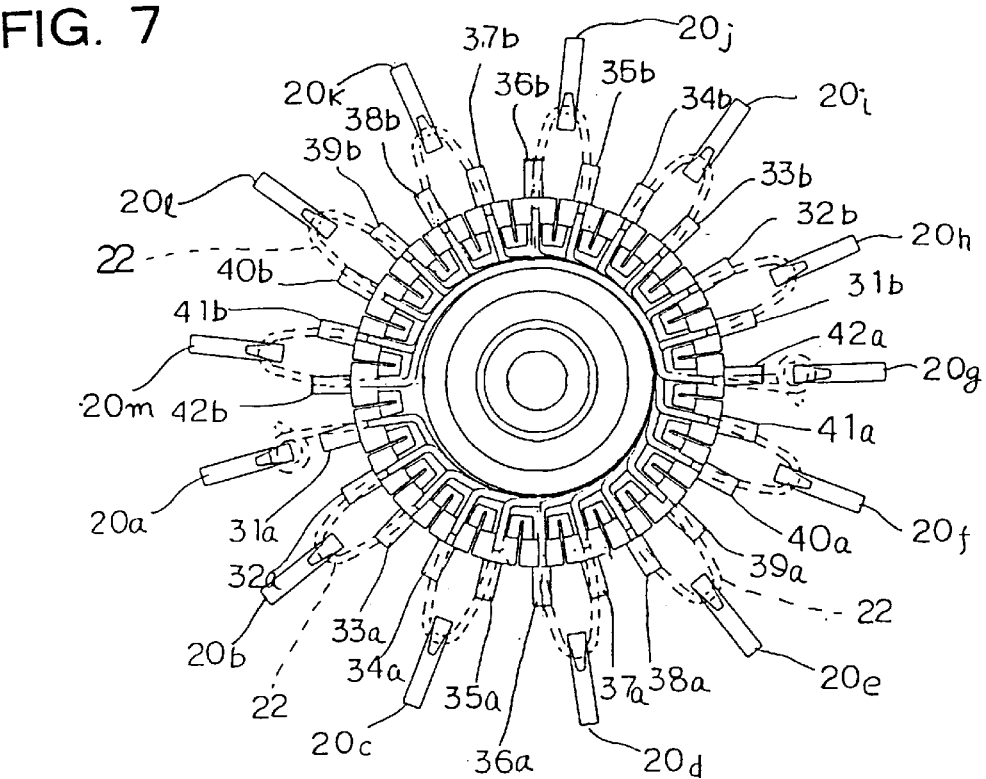
FIG. 7 is a partial cross-section of the commutator assembly in FIG. 6.
Figure 6:
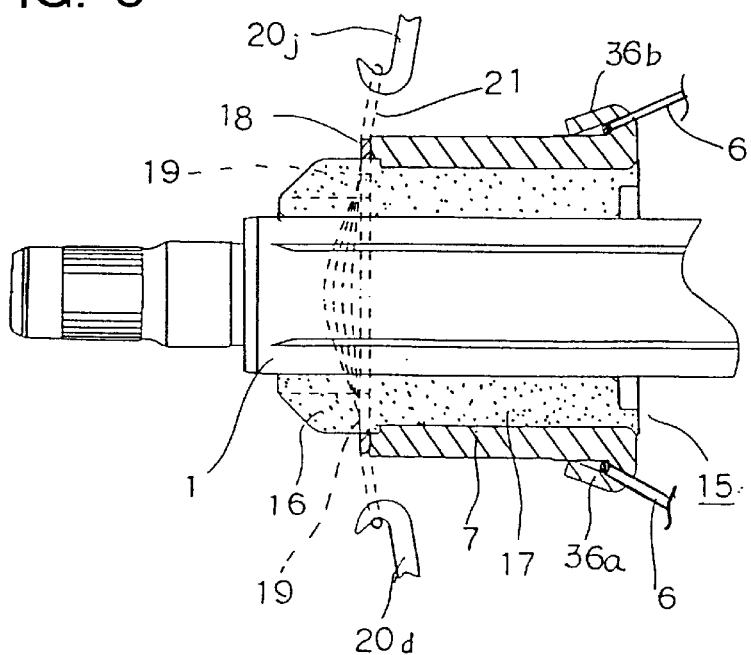
FIG. 6 is a front elevation of a commutator assembly for an electric motor according to Embodiment 4 of the present invention.

FIG. 6 is a front elevation of a commutator assembly 15 for an electric motor according to Embodiment 4 of the present invention, and FIG. 7 is a partial cross-section of the commutator assembly 15 in FIG. 6.

The commutator assembly 15 in this embodiment comprises: a commutator 17 having twenty-four commutator segments 7 plurally disposed so as to be spaced circumferentially around the outer circumference of a base 16 composed of resin; four brushes disposed equidistantly so as to contact the surface of the commutator 17 by the elastic force of springs; and equalizing connectors 18 electrically connecting each of the hooks 31a to 42b of commutator segments 7 which should have the same electric potential to each other. At the opposite end of the base 16 from the hooks 31a to 42b, a plurality of grooves 19 for receiving equalizing connectors 18 are formed in a radial shape.

In this embodiment, connection of commutator segments 7 which should have the same electric potential to each other by means of the equalizing connectors 18 is performed by fastening wires 21 continuously onto a plurality of fasteners 20a to 20m arranged equidistantly around a circumference using a winding machine, as described below.

First, one end of an enamel-coated copper wire 21 is fastened to a fastener 20a. Next, the wire 21 is passed inwards from outside through a groove 19 using a winding machine, then laid across the shaft 1 and passed from inside outwards through a groove 19 on the opposite side, and is fastened to a fastener 20h. Thereafter, the wire 21 is passed inwards from outside through an adjacent groove 19, then laid across the shaft 1 and passed from inside outwards through a groove 19 on the opposite side, and is fastened to a fastener 20b. This series of operations is repeated until finally the other end of the wire 21 is fastened to a fastener 20g.

Next, the unwanted portions 22 (broken lines in FIG. 6) connecting adjacent commutator segments 7 to each other are removed, forming equalizing connectors 18.

Finally, both ends of the equalizing connectors 18 are electrically connected to the end surfaces of the commutator segments 7 by fusing, etc.

Moreover, the step of removing the unwanted portions 22 and the step of electrical connection may be performed in reverse order. Furthermore, after fastening the wire onto the fastening portions, a winding can immediately be disposed on the core by winding the wire onto the core 4 by a lap winding method by means of the hooks 31a to 42b.

In this embodiment, connection of commutator segments 7 to each other by means of the equalizing connectors 18 is performed continuously using a winding machine, thereby increasing productivity. Moreover, productivity can be further increased by employing a plurality of nozzles on the winding machine.

Furthermore, because the equalizing connectors 18 are disposed at the opposite end of the commutator segments 7 from the hooks 31a to 42b, the winding can be formed smoothly by winding wiring 6 into slots 5 by means of the hooks 31a to 42b without being affected by the equalizing connectors 18.

Furthermore, the equalizing connectors 18 are located radially further inwards than the sliding surfaces of the commutator 17 on which the brushes slide, facilitating mounting of the brushes.

Embodiment 5

Figure 8:
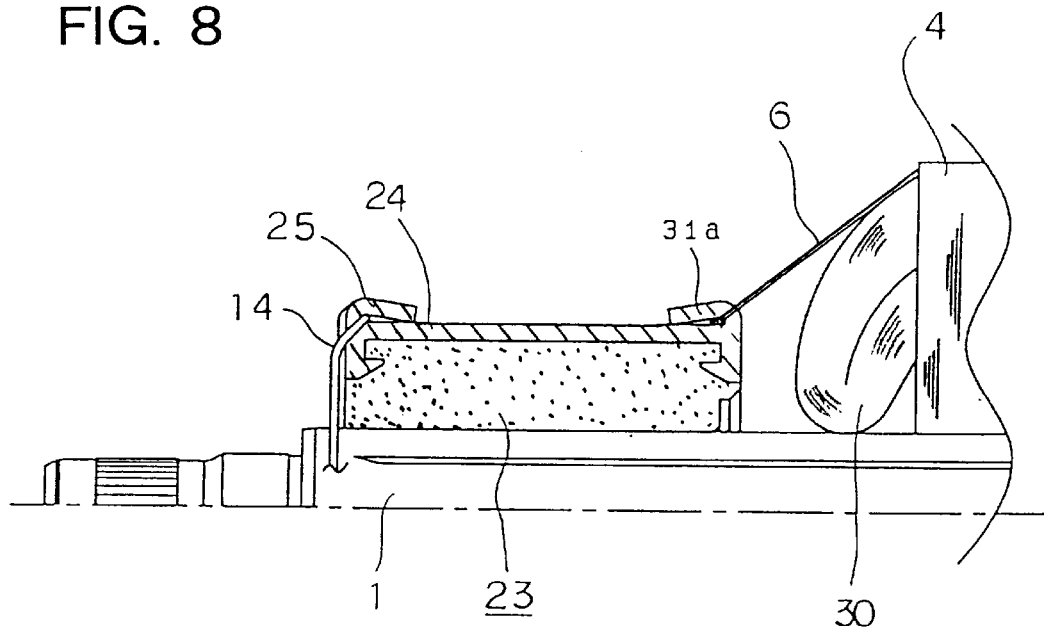
FIG. 8 is a partial cross-section of an electric motor according to Embodiment 5 of the present invention.

FIG. 8 is a partial cross-section of a commutator assembly 23 for an electric motor according to Embodiment 5 of the present invention. In this commutator assembly 23, hooks 31a to 41b are formed at one end of commutator segments 24 and equalizing connector fastening portions 25 are formed at the other end. Furthermore, equalizing connectors 14 with a larger diameter than that of the wiring 6 are used with the equalizing connector fastening portions 25.

In this embodiment, because the hooks 31a to 41b and the equalizing connector fastening portions 25 are both bended axially inwards relative to the commutator assembly 23, the bending of the hooks 31a to 41b and the equalizing connector fastening portions 25, and electrical connection of the wiring 6 to the hooks 31a to 41b and electrical connection of the equalizing connectors 14 to the equalizing connector fastening portions 25 by fusing can be simultaneously performed by pressing a pressing member (not shown) axially inwards.

Furthermore, because the diameter of the wire in the equalizing connectors 14 is large, electrical connection between the equalizing connectors 14 and the equalizing connector fastening portions 25 is sounder, increasing reliability with respect to electrical connections.

Furthermore, because the equalizing connectors 14 are disposed at the opposite end of the commutator segments 24 from the hooks 31a to 41b, the winding 30 can be formed smoothly by winding wiring 6 into slots 5 by means of the hooks 31a to 41b without being affected by the equalizing connectors 14.

Embodiment 6

Figure 9:
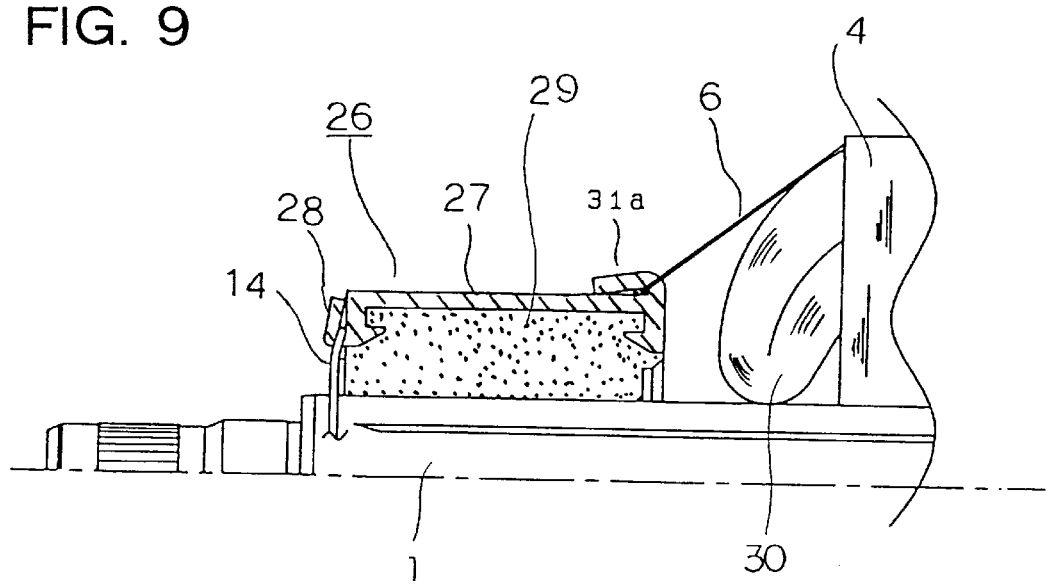
FIG. 9 is a partial cross-section of an electric motor according to Embodiment 6 of the present invention.

FIG. 9 is a partial cross-section of a commutator assembly 26 according to Embodiment 6 of the present invention. In this commutator assembly 26, hooks 31a to 41b are formed at one end of commutator segments 27 and equalizing connector fastening portions 28 are formed at the other end positioned radially inwards from the commutator 29. Furthermore, equalizing connectors 14 with a larger diameter than that of the wiring 6 are used with the equalizing connector fastening portions 28.

In this embodiment, equalizing connector fastening portions 28 are located radially further inwards than the sliding surfaces of the commutator 29 on which the brushes slide, facilitating mounting of the brushes.

Furthermore, because the equalizing connector fastening portions 28 are disposed at the opposite end of the commutator segments 27 from the hooks 31a to 41b, the winding 30 can be formed smoothly by winding wiring 6 into slots 5 by means of the hooks 31a to 41b without being affected by the equalizing connectors 14.

Embodiment 7

Figure 10:
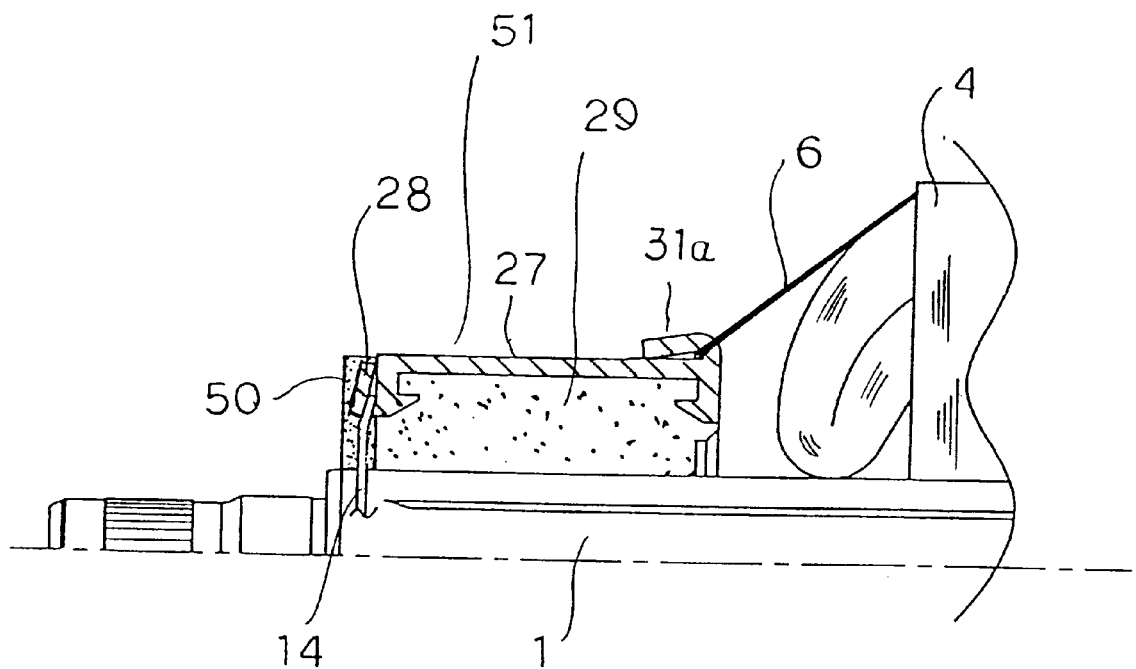
FIG. 10 is a partial cross-section of an electric motor according to Embodiment 7 of the present invention.

FIG. 10 is a partial cross-section of a commutator assembly 51 according to Embodiment 7 of the present invention. In this commutator assembly 51, the commutator 29 and the equalizing connectors 14 fastened to the equalizing connector fastening portions 28 are integrated by resin 50. For that reason, the connection between the equalizing connectors 14 and the equalizing connector fastening portions 28 is sound and will not be dislodged during manufacture, increasing productivity as well as preventing shorting between the equalizing connectors 14. Furthermore, the equalizing connectors 14 will not be dislodged from the equalizing connector fastening portions 28 by vibrations, etc., even during operation of the electric motor, thus increasing reliability.

Embodiment 8

Figure 11:
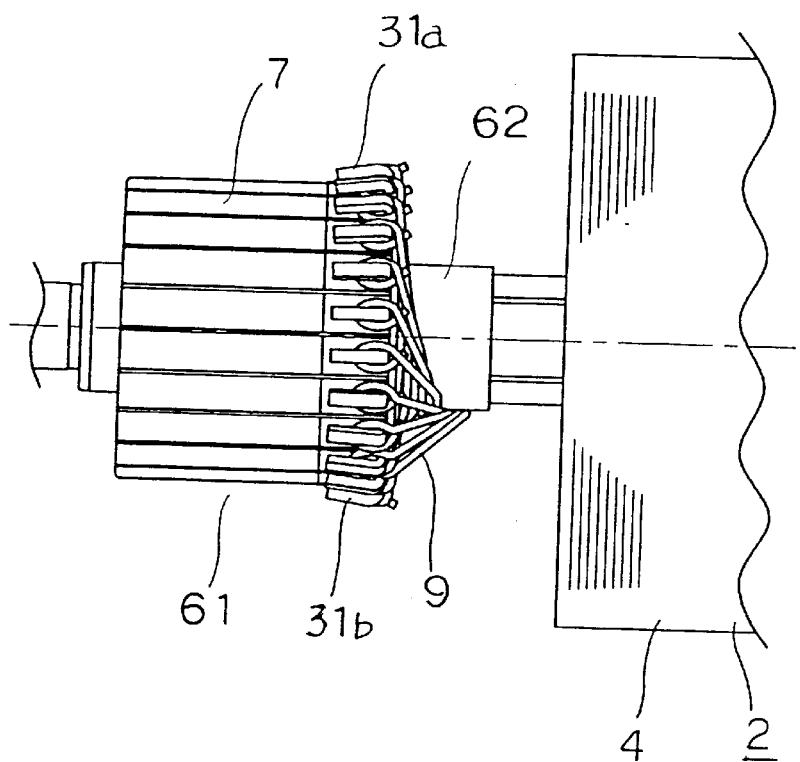
FIG. 11 is a partial side elevation of an electric motor according to Embodiment 8 of the present invention.
Figure 12:
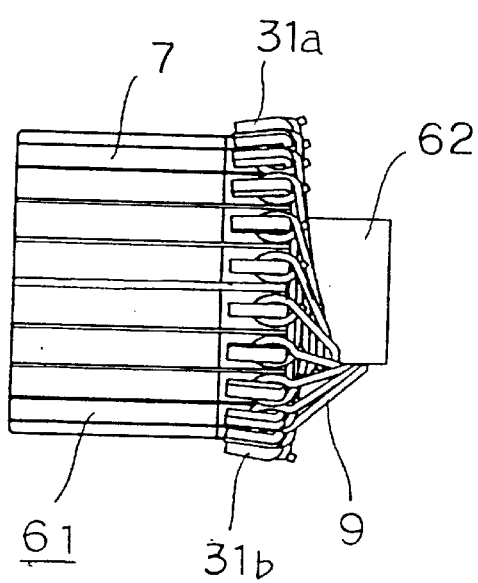
FIG. 12 is a side elevation of the commutator assembly in FIG. 11.
Figure 13:
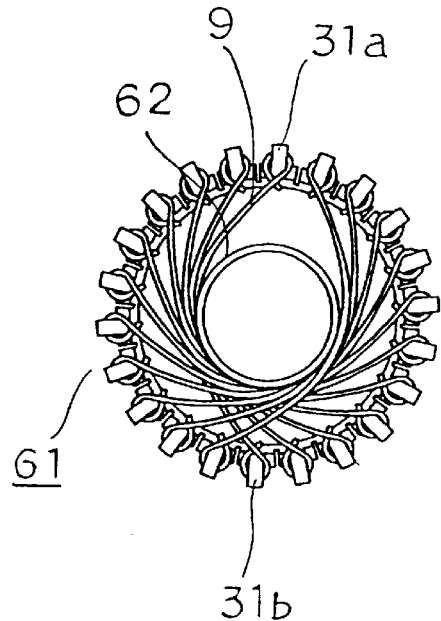
FIG. 13 is a view from the right-hand side of the commutator assembly in FIG. 12.
Figure 14:
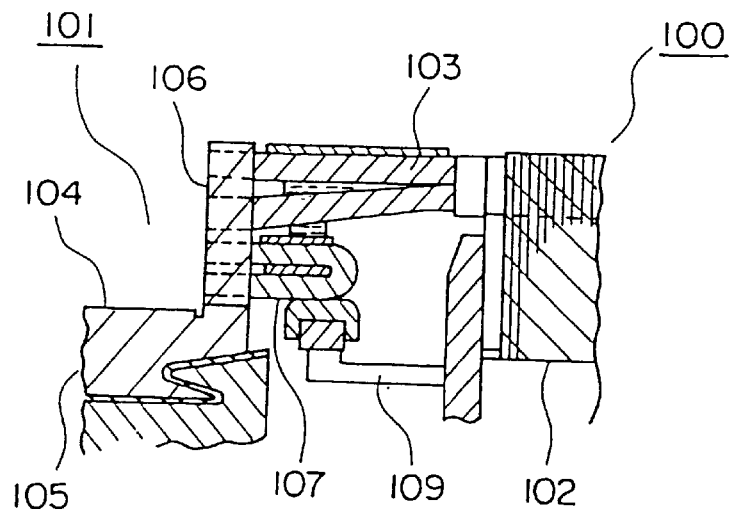
FIG. 14 is a partial cross-section of a conventional electric motor.
Figure 15:
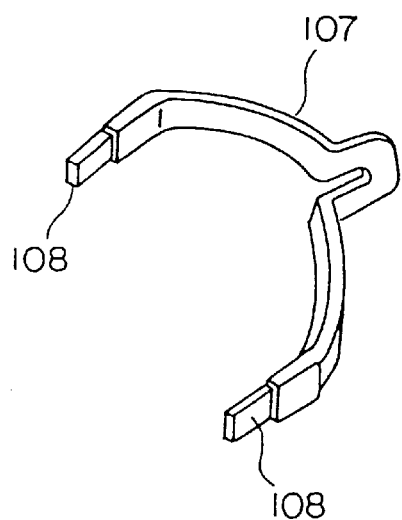
FIG. 15 is a perspective view of an equalizing connector from FIG. 14.

FIG. 11 is a partial side elevation of an electric motor according to Embodiment 8 of the present invention, FIG. 12 is a side elevation of the commutator assembly 61 in FIG. 11, and FIG. 13 is a view from the right-hand side of the commutator assembly 61 in FIG. 12.

The commutator assembly 61 is the same as the commutator assembly 3 in Embodiment 1 except that a cylindrical collar 62 is fitted over the shaft at one end of the commutator assembly 61.

In the commutator assembly 3 of Embodiment 1, when the one end of each of the equalizing connectors 9 is fastened to the hooks 31a to 41a and the other end of each is fastened to the hooks 31b to 41b, the equalizing connectors 9 are wound across the shaft 1 and the step of fastening the equalizing connectors 9 cannot be performed until the commutator assembly 3 is secured to the shaft 1. In contrast thereto, in the case of Embodiment 8, the fastening of the equalizing connectors 9 may be performed by winding across the collar 62, increasing the degree of freedom in the manufacturing process.

Moreover, the above embodiments have been explained using an electric motor as an example of a dynamo-electric machine, but the present invention can also be applied to a generator. Furthermore, the number of poles may be six, or eight, etc., and the number of slots is not limited to twenty-two or twenty-four. Nor is the number of equalizing connectors limited to eleven or twelve.

As explained above, the dynamo-electric machine according to one aspect of the present invention comprises: a shaft; a core secured to the shaft having slots formed therein extending in the axial direction; a winding composed of a wiring wound by a lap winding method through the slots; a commutator having commutator segments disposed at one end of the core and secured to the shaft; and equalizing connectors electrically connecting commutator segments which should have the same electric potential to each other; the equalizing connectors being disposed in close contact with an end surface of the commutator. Therefore, supporting members are not required for the equalizing connectors, enabling the number of parts to be reduced as well as reducing the space occupied by the equalizing connectors, thereby enabling the size of the dynamo-electric machine to be reduced.

According to one form of the dynamo-electric machine, the equalizing connectors may be part of the wiring composing the winding. Therefore, the number of parts can be reduced and the connection of the equalizing connectors and the winding of the wiring can be performed continuously, increasing productivity.

According to another form of the dynamo-electric machine, the equalizing connector fastening portions may be disposed on the same side of the commutator segments as the core, the equalizing connectors being fastened to said equalizing connector fastening portions. Therefore, the equalizing connectors can be electrically connected to the equalizing connector fastening portions more soundly, increasing the reliability of the electrical connections. Furthermore, after the step of connecting the equalizing connectors to the equalizing connector fastening portions, there is no need to form the winding immediately, that is, the step of connecting the equalizing connectors to the equalizing connector fastening portions can be performed independently from the step of forming the winding, increasing the degree of freedom in the manufacturing process for the dynamo electric machine.

According to still another form of the dynamo-electric machine, the equalizing connector fastening portions may be disposed on the opposite side of the commutator segments from the core, the equalizing connectors being fastened to the equalizing connector fastening portions. Therefore, the winding can be formed by winding the wiring onto the core without being obstructed by the equalizing connectors. Furthermore, the equalizing connectors can be fastened to the equalizing connector fastening portions even after winding the wiring onto the core, increasing the degree of freedom in the manufacturing process for the dynamo electric machine.

According to one form of the dynamo-electric machine, the diameter of the equalizing connectors may be larger than the diameter of the wiring. Therefore, the equalizing connectors can be electrically connected to the commutator segments more soundly, increasing the reliability of the electrical connections. Furthermore, the physical strength of the equalizing portions is increased, reducing the likelihood of breakages due to fusing, etc.

According to another form of the dynamo-electric machine, the equalizing connectors may be disposed further inwards than the outer circumference of the commutator. Therefore, the brushes can be mounted without being obstructed by the equalizing connectors, facilitating mounting of the brushes.

According to still another form of the dynamo-electric machine, the equalizing connectors may have a smaller diameter than the diameter of the wiring, the equalizing connectors and the wiring being fastened to hooks formed by bending the commutator segments, and the equalizing connectors being positioned on the side of the hooks closest to the bended portions of the hooks. Therefore, the equalizing connectors can be fastened without modifying existing commutator assembly wherein wiring is fastened onto hooks.

According to one form of the dynamo-electric machine, the commutator and the equalizing connectors fastened to the equalizing connector fastening portions may be integrated by resin. Therefore, the connection between the equalizing connectors and the equalizing connector fastening portions is sound and will not be dislodged during manufacture, increasing productivity as well as preventing shorting between the equalizing connectors.

According to another form of the dynamo-electric machine, the cylindrical collar fitting over the shaft may be disposed on an end surface of the commutator, the commutator segments being electrically connected to each other with the equalizing connectors wound across the collar. Therefore, the fastening of the equalizing connectors does not need to be performed by winding across the shaft, increasing the degree of freedom in the manufacturing process.

According to still another form of the dynamo-electric machine, the winding may comprise a plurality of coil portions offset by one slot each and wound a plurality of laps circumferentially around the core, each of the coil portions being formed by winding a wire a plurality of turns between a pair of slots separated by a predetermined number of slots. Therefore, the winding time is longer than that for a single winding, but the wiring is finer than the wiring in a single winding, improving windability and increasing the wire-to-space ratio of the winding in the slots.

According to one form of the dynamo-electric machine, the equalizing connectors each may comprise an electric conductor with an insulating coating formed on the surface thereof. Therefore, when the equalizing connectors are, for example, round enamel-coated copper wires, windability is improved and manufacturing costs are reduced.

The method of manufacture for a dynamo-electric machine according to one aspect of the present invention includes: a step of connecting commutator segments which should have the same electric potential to each other by cutting the wire after using the wire to fasten commutator segments which should have the same electric potential to each other, and a step of immediately thereafter forming a winding by winding the wire onto the core. Therefore, winding of the wiring can be performed immediately after connection of the equalizing connectors, increasing productivity.

The method of manufacture for a dynamo-electric machine according to another aspect of the present invention includes: a step of connecting the commutator segments to each other continuously by a continuous wire, a step of forming equalizing connectors by removing unwanted wire connecting the commutator segments to each other, and a step of electrically connecting both ends of the equalizing connectors to the commutator segments. Therefore, the equalizing connectors can be electrically connected to the commutator segments in a short time, increasing productivity.

According to one form of the method of manufacture for a dynamo-electric machine, the method may include a step of forming a winding by winding the continuous wire onto the core immediately after connecting the commutator segments to each other using the continuous wire. Therefore, the connection of the equalizing connectors and the winding of the wiring can be performed continuously, increasing productivity.

According to another form of the method of manufacture for a dynamo-electric machine, the winding may comprise a plurality of coil portions offset by one slot each and wound a plurality of laps circumferentially around the core, each of the coil portions being formed by winding a wire a plurality of turns between a pair of slots separated by a predetermined number of slots. Therefore, winding time is longer than that for a single winding, but the wiring is finer than the wiring in a single winding and windability is improved, increasing productivity.

What is claimed is:

1. A dynamo-electric machine, comprising:
   a) a shaft;
   b) a core secured to said shaft having slots formed therein extending in an axial direction;
   c) a winding composed of electrical wiring wound by a lap winding method and extending through said slots;
   d) a commutator having a plurality of commutator segments disposed at one end of said core and secured to said shaft; and
   e) a plurality of equalizing connectors individually electrically connecting commutator segments which should have the same electrical potential to each other;
   f) wherein said equalizing connectors are disposed in close contact with an end surface of said commutator.

2. The dynamo-electric machine according to claim 1 wherein said equalizing connectors are composed of a same material as said wiring composing said winding.

3. The dynamo-electric machine according to claim 1, wherein equalizing connector fastening members are disposed on a same side of said commutator segments as said core, said equalizing connectors being fastened to said equalizing connector fastening members.

4. The dynamo-electric machine according to claim 3, wherein said commutator side and said equalizing connectors fastened to said equalizing connector fastening members are encased by resin.

5. The dynamo-electric machine according to claim 1, wherein equalizing connector fastening members are disposed on an opposite side of said commutator segments from said core, said equalizing connectors being fastened to said equalizing connector fastening members.

6. The dynamo-electric machine according to claim 1, wherein a diameter of said equalizing connectors is larger than a diameter of said wiring.

7. The dynamo-electric machine according to claim 1, wherein said equalizing connectors are disposed further radially inwardly than an outer circumference of said commutator.

8. The dynamo-electric machine according to claim 1, wherein said equalizing connectors have a smaller diameter than a diameter of said wiring, said equalizing connectors and said wiring are fastened to hooks formed by bending ends of said commutator segments, and said equalizing connectors are positioned on a side of said hooks closest to said bent ends.

9. The dynamo-electric machine according to claim 1, wherein a cylindrical collar fitting over said shaft is disposed on an end surface of said commutator, and said commutator segments are electrically connected to each other with said equalizing connectors wound across said collar.

10. The dynamo-electric machine according to claim 1, wherein said winding comprises a plurality of coil portions offset by one slot each and wound a plurality of laps circumferentially around said core, each of said coil portions being formed by winding a wire a plurality of turns between a pair of slots separated by a predetermined number of slots.

11. The dynamo-electric machine according to claim 1, wherein said equalizing connectors each comprise an electric conductor with an insulating coating formed on the surface thereof.

12. A method of manufacturing a dynamo-electric machine comprising:
   a) a shaft;
   b) a core secured to said shaft having slots formed therein extending in an axial direction;
   c) a winding composed of electrical wiring wound by a lap winding method and extending through said slots;
   d) a commutator having a plurality of commutator segments disposed at one end of said core and secured to said shaft; and
   e) a plurality of equalizing connectors individually electrically connecting commutator segments which should have the same electrical potential to each other and disposed in close contact with an end surface of said commutator; said equalizing connectors and said wiring being parts of the same wire,
   said method comprising the steps of:
   f) connecting commutator segments which should have the same electric potential directly to each other using said equalizing connectors,
   g) cutting protruding ends of said equalizing connectors; and
   h) immediately thereafter forming said winding on said core.

13. The method according to claim 12, wherein said winding comprises a plurality of coil portions offset by one slot each and wound a plurality of laps circumferentially around said core, each of said coil portions being formed by winding a wire a plurality of turns between a pair of slots separated by a predetermined number of slots.

14. A method of manufacturing a dynamo-electric machine comprising:
   a) a shaft;
   b) a core secured to said shaft having slots formed therein extending in an axial direction;
   c) a winding composed of electrical wiring wound by a lap winding method and extending through said slots;
   d) a commutator having a plurality of commutator segments disposed at one end of said core and secured to said shaft; and
   e) a plurality of equalizing connectors individually electrically connecting commutator segments which should have the same electrical potential to each other and disposed in close contact with an end surface of said commutator;
   said method comprising the steps of:
   f) coupling said commutator segments to each other continuously by a continuous wire, g) forming said equalizing connectors by removing unwanted wire loops formed by said continuous wire, and h) electrically connecting both ends of said equalizing connectors to said coupled commutator segments.

15. The method according to claim 14, further including forming said winding on said core immediately after connecting said commutator segments to each other.

* * * * *